(12) United States Patent
Brahm et al.

(10) Patent No.: US 6,410,095 B1
(45) Date of Patent: *Jun. 25, 2002

(54) SOLVENT-FREE BINDER COMPOSITIONS AND THEIR USE IN ONE- AND TWO-COMPONENT COATING COMPOSITIONS

(75) Inventors: Martin Brahm, Leverkusen; Gerhard Ruttmann, Burscheid; Lutz Schmalstieg, Köln, all of (DE)

(73) Assignee: Bayer Aktiengesellschaft, Leverkusen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/706,551

(22) Filed: Sep. 6, 1996

(30) Foreign Application Priority Data

Sep. 15, 1995 (DE) ......................................... 195 34 162

(51) Int. Cl.$^7$ .................. C09D 175/04; C09D 175/02; C08G 18/78; C08G 18/77
(52) U.S. Cl. .................. 427/385.5; 528/45; 528/49; 528/59; 528/60; 528/61; 528/65; 528/67; 528/68; 528/85; 560/24; 560/25; 560/336; 560/358; 560/359
(58) Field of Search ............................... 528/45, 49, 59, 528/60, 61, 65, 67, 68, 85; 560/24, 25, 336, 358, 359

(56) References Cited

U.S. PATENT DOCUMENTS

| 3,769,318 A |   | 10/1973 | Windemuth et al. | 560/24 |
| 3,832,311 A |   | 8/1974  | Windemuth et al. | 521/160 |
| 4,160,080 A |   | 7/1979  | Köenig et al.    | 528/59 |
| 4,810,820 A |   | 3/1989  | Slack et al.     | 560/27 |
| 5,319,054 A | * | 6/1994  | Slack et al.     | 528/48 |
| 5,466,771 A | * | 11/1995 | Hicks et al.     | 528/64 |

FOREIGN PATENT DOCUMENTS

GB        994890        6/1965

* cited by examiner

*Primary Examiner*—Rabon Sergent
(74) *Attorney, Agent, or Firm*—Joseph C. Gil; Thomas W. Roy; Diderico van Eyl

(57) ABSTRACT

The present invention relates to substantially solvent-free binder compositions containing a) a polyisocyanate component containing heteroallophanate groups and having aromatically-bound isocyanate groups,
   i) an NCO content of 3 to 16%,
   ii) an average functionality of 1.8 to 4,
   iii) an allophanate group content (calculated as $C_2N_2O_3$, MW: 101) of 5 to 35% and
   iv) a hydrocarbon chain content of 10 to 65%, wherein the hydrocarbon chains are attached to allophanate groups via oxygen and have an average of 2 to 23 carbon atoms and
b) an isocyanate-reactive component. The present invention also relates to the use of these binder compositions in one- and two-component coating compositions.

11 Claims, No Drawings

SOLVENT-FREE BINDER COMPOSITIONS AND THEIR USE IN ONE- AND TWO-COMPONENT COATING COMPOSITIONS

BACKGROUND OF THE INVENTION

1. Field of the Invention

The present invention relates to a substantially solvent free binder composition containing a polyisocyanate component containing heteroallophanate groups and an isocyanate-reactive component, and to its use two-component coating compositions.

2. Description of the Prior Art

Binder compositions, other than epoxide systems, which are used in architectural protective coatings, in particular for high quality flexible coatings, are those prepared from polyisocyanates and isocyanate-reactive compounds such as polymeric polyols. The requirements in such applications are for coatings with an increased film thickness, which largely excludes the use of products containing solvents.

Binder compositions based upon solvent-free aliphatic polyisocyanates exhibit excellent yellowing resistance in such applications. However, in comparison to polyisocyanates having aromatically-bound isocyanate groups, they cure slowly. Furthermore, the coatings obtained from these products do not have sufficient hardness.

In combination with polymeric polyols, aromatic polyisocyanates exhibit rapid curing and development of hardness. However, relatively thick films may be cured without blistering only if special hydrophobic polyester polyols are used.

The required low viscosity of the polyisocyanate component may be achieved in the previously used aromatic systems only by dilution with monomeric diisocyanates. For toxicological reasons, only those products based upon diisocyanato-diphenylmethane may be used for dilution. The diluted polyisocyanate component may be combined with polyols based on castor oil to form binder compositions. However, due to its inadequate saponification resistance, this binder composition cannot be applied directly as a two-component system onto basic substrates. It is thus restricted to the preparation of intermediate layers and topcoat layers.

Polyisocyanates containing allophanate groups and based on aliphatic or aromatic diisocyanates are known and have been described, for example, in GB-A-994,980, EP-A-303, 150, EP-A-194, DE-A-2,009,179 and 2,040,645 and U.S. Pat. No. 3,769,318. However, these publications do not describe solvent-free binder compositions which cure to yield blister-free coatings having good hardness in thick layers. Due to their slow curing, excessively high intrinsic viscosity and excessive susceptibility to blistering, the polyisocyanates having aromatically-bound isocyanate groups and containing homoallophanate groups and the polyisocyanates having aliphatically-bound isocyanate groups, which are described in these publications, are not suitable in binder compositions with polyols.

Accordingly, it is an object of the present invention to provide solvent-free binder compositions, which are suitable in particular for sealing concrete and which rapidly cure, even in thick layers, to yield blister-free coatings having good hardness.

This object may be achieved with the binder compositions according to the invention containing low viscosity isocyanate-reactive compounds and solvent-free aromatic polyisocyanates containing heteroallophanate groups.

According to the invention, polyisocyanates containing "heteroallophanate groups" are understood to be products having allophanate groups, the majority of which are prepared from one aliphatic and one aromatic isocyanate group. In contrast, polyisocyanates containing "homoallophanate groups" are understood to be compounds having allophanate groups which are prepared from two aliphatic or two aromatic isocyanate groups.

SUMMARY OF THE INVENTION

The present invention relates to substantially solvent-free binder compositions containing a) a polyisocyanate component containing heteroallophanate groups and having aromatically-bound isocyanate groups,
   i) an NCO content of 3 to 16%,
   ii) an average functionality of 1.8 to 4,
   iii) an allophanate group content (calculated as $C_2HN_2O_3$, MW: 101) of 5 to 35% and
   iv) a hydrocarbon chain content of 10 to 65%, wherein the hydrocarbon chains are attached to allophanate groups via oxygen and have an average of 2 to 23 carbon atoms and b) an isocyanate-reactive component.

The present invention also relates to the use of these binder compositions in one- and two-component coating compositions.

DETAILED DESCRIPTION OF THE INVENTION

In the binder compositions according to the invention, polyisocyanate component a) has i) an NCO content of 3 to 16, preferably of 5 to 13 and more preferably of 7 to 10.5%,
ii) an average functionality of 1.8 to 4, preferably of 1.9 to 3 and more preferably of about 2.0,
iii) an allophanate group content (calculated as $C_2HN_2O_3$, molecular weight MW: 101) of 5 to 35%, preferably of 10 to 23% and
iv) a hydrocarbon chain content of 10 to 65%, preferably of 18 to 53% and more preferably of 30 to 53%, wherein the hydrocarbon chains may be linear, branched, saturated or unsaturated, are attached to allophanate groups via oxygen, have an average of 2 to 23, preferably 8 to 23 and more preferably 16 to 23 carbon atoms, and may optionally contain oxygen atoms.

Polyisocyanate component a) used in the coating compositions according to the invention is produced by reacting a linear aliphatic diisocyanate component a1) with a hydroxyl component a2) in an NCO/OH equivalent ratio of 1.0:1.0 to 0.5:1.0, preferably 1.0:1.0 to 0.6:1.0 and more preferably 1.0:1.0. The reaction is performed at a temperature of 40 to 140° C., preferably 60 to 120° C.

The compounds or mixtures of compounds containing urethane groups obtained in this manner have a number average molecular weight of 250 to 4000, preferably 300 to 2000 and more preferably 300 to 1000, which may be determined from the stoichiometry of the starting components.

If an excess of hydroxyl component a2) is used during urethanization, a portion of hydroxyl component a2) remains in the reaction product. In one embodiment of the process, this excess amount of hydroxyl component a2) (or a portion thereof) may be added when diisocyanate component a3) has been added. The excess reacts with diisocyanate component a3) to yield urethane and ultimately allophanate groups.

The urethane produced from components a1) and a2) may also be produced from the amine on which the isocyanate component a1) is based by using known phosgene-free urethane syntheses described, for example, in EP-A-27,940, EP-A-27,952, EP-A-27,953, EP-A-323,514 and EP-A-355,443. However, this is less preferred.

The urethane component prepared from components a1) and a2) is reacted with diisocyanate component a3) in an NCO/urethane equivalent ratio of 3:1 to 100:1, preferably 6:1 to 60:1 and more preferably 8:1 to 30:1, at a temperature of 20° C. to 150° C., preferably 50° C. to 120° C. and more preferably 60° C. to 90° C. The allophanatization reaction is preferably accelerated using conventional catalysts known from the literature.

Examples of usable catalysts are tetraalkylammonium hydroxides or arylakylammonium hydroxides; metal salts such as iron(III) chloride and potassium octoate; zinc compounds such as zinc stearate, zinc octoate, zinc naphthenate and zinc acetylacetonate; tin compounds such as tin(II) octoate, tin(l) ethylhexanoate and tin(II) laurate, dibutyltin oxide, dibutyltin dichloride, dibutyltin diacetate, dibutyltin dilaurate, dibutyltin maleate and dioctyltin diacetate; manganese, cobalt and nickel compounds together with mineral acids such as trifluoroacetic acid, sulphuric acid, hydrochloric acid, hydrobromic acid, phosphoric acid and perchloric acid; aluminum tri(ethylaceto-acetate); and mixtures thereof.

Strong acids, such as those described in EPA-194, may also be used for the reaction of urethane groups with aromatic isocyanate compounds. However, this is less preferred.

The catalysts may be added before the allophanatization reaction or before urethanization. They are used at a concentration of 0.001% to 5%, preferably 0.005% to 1%, based on the weight of the reaction components. Where possible, the catalyst may be removed from the reaction mixture by distillation. However, it is also possible to terminate the reaction by adding suitable catalyst poisons (for example, water or acid chlorides).

After the allophanatization reaction, the excess, distillable starting diisocyanate a3) is removed, preferably by film distillation, down to a residual content in the product of less than 0.5, preferably less than 0.2 wt. %. The heteroallophanates having aromatically-bound isocyanate groups generally have sufficient thermal stability not to cleave back to urethane and diisocyanate to a great extent during distillation of excess component a3).

Linear or branched diisocyanates having aliphatically-bound isocyanate groups and an NCO content of 30 to 60%, preferably 40 to 60% may be used as diisocyanate component a1). Examples include 1,4-diisocyanatobutane, 1,5-diisocyanatopentane, 1,6-diisocyanatohexane (HDI), 2,2,4- and 2,4,4-trimethyl-1,6-diisocyanato-hexane, 1,11-diisocyanatoundecane, dodecamethylene diisocyanate and mixtures thereof.

Small amounts (up to 20 mole %) of monofunctional or higher than difunctional isocyanate compounds, such as butyl isocyanate, stearyl isocyanate and 2-ethylhexyl isocyanate, may also be used. However, this is not preferred.

1,6-diisocyanatohexane, 1,4-diisocyanatobutane and mixtures thereof are preferred as the diisocyanate component a1).

Alcohol component a2) is selected from linear, branched, saturated or unsaturated alcohols or mixtures of alcohols having an average hydrocarbon chain 2 to 23, preferably 8 to 23 and more preferably 16 to 23 carbon atoms. The OH functionality of the alcohol component is between 1 and 1.5, preferably between 1 and 1.2 and more preferably 1.

Examples include methanol, ethanol, n-propanol, iso-propanol, methoxypropanol, the isomeric butanols, pentanols, hexanols, heptanols, octanoles and n-nonanol, n-decanol, n-dodecanol, n-octadecanol, Lorol alcohols (available from Henkel), saturated fatty alcohol and mixture thereof.

Higher functional alcohol components may also be blended with the mono-functional alcohols. Examples of these alcohols include ethylene glycol, 1,2- and 1,3-propanediol, 1,4- and 1,3-butanediol, 1,6-hexanediol, 1,8-octanediol, 1,9-nonanediol, 1,10-decanediol, 1,12-dodecanediol, 1,12-octadecanediol, neopentyl glycol, 1,4-bishydroxy-methylcyclohexane, 2-methyl-1,3-propanediol, 2,2,4-tri-methyl-1,3-pentanediol, 2-ethyl-1,3-hexanediol, diethylene glycol, triethylene glycol, tetraethylene glycol, dipropylene glycol, tripropylene glycol, dimer fatty alcohols, trimer fatty alcohols, glycerol, trimethylolpropane (TMP), trimethylolethane, the isomeric hexanetriols, polyethers having a number average molecular weight of 4000, and mixtures thereof.

Unsaturated alcohols such as trimethylolpropane diallyl ether, isomeric butanols and monofunctional alcohols derived from appropriate acids or acid mixtures of unsaturated synthetic and natural fatty acids may also be used. Naturally occurring fatty acid mixtures include the acids derived from castor oil, hydrogenated peanut oil, cottonseed oil, safflower oil, tung oil, soya oil, sunflower oil, linseed oil, rapeseed oil, tall oil, sperm oil and herring oil.

In addition to unsaturated monofunctional alcohols, it is also possible to use reaction products prepared from the previously mentioned unsaturated or saturated fatty acids with epoxide compounds, such as ethylene oxide, propylene oxide, butylene oxide, styrene oxide and 2-ethylhexyl oxide as alcohol component a2).

Finally, it is also possible to use transesterification products prepared from fatty acid based triglycerides with higher functional polyols, such as glycerol, trimethylolpropane, pentaerythritol and sorbitol, as the alcohol component a2). These products contain mono, di- and trihydric alcohol components, in addition to unreacted triglycerides.

Diisocyanate component a3) is selected from diisocyanates having aromatically-bound isocyanate groups and an NCO content of 35 to 53, preferably 40 to 50%. Examples include the isomeric tolylene diisocyanates, naphthylene diisocyanates, phenylene diisocyanates and mixtures of these and other aromatic diisocyanates.

In order to achieve specific properties, it is possible to optionally use up to 20 mole % of monoisocyanates, such as phenyl isocyanate, or triisocyanates.

2,4- and/or 2,6-tolylene diisocyanate are preferably used as component a3).

Component b) is selected from compounds having at least two isocyanate-reactive groups or at least two groups which may be converted into isocyanate-reactive groups by hydrolysis. It is also possible to use compounds which have both free and such reversibly blocked isocyanate-reactive groups. It is also possible to use mixtures of the various individual types of compounds or mixtures of compounds having isocyanate-reactive groups with compounds having reversibly blocked iso-cyanate-reactive groups.

Component b) preferably has an average of 2 to 6 free or blocked isocyanate-reactive groups. The molecular weight of component b) is critical and may vary over a wide range.

Preferably, low molecular weight compounds, i.e., those having a molecular weight of approximately 100 to 600, are used.

The quantity of component b) is calculated such that the equivalent ratio of the isocyanate groups of component a) to the free and/or reversibly blocked, isocyanate-reactive groups of component b) is 0.8:1 to 10:1, preferably 0.9:1 to 4:1, more preferably 1:1 to 2:1 and most preferably 1:1 to 1.2:1.

Examples of compounds that may be used as component b) include:

the polyoxazolidines which are known from polyurethane chemistry and described, e.g., in DE-A-2,018,233 (U.S. Pat. No. 3,743,626, herein incorporated by reference) and DE-A-2,446,438 (U.S. Pat. No. 4,002,601, herein incorporated by reference);

the polyketimines or polyaldimines which are known from polyurethane chemistry and described, e.g, in DE-A-1,520,139 (U.S. Pat. No. 3,420,800, herein incorporated by reference) and DE-A-3,308,418 (U.S. Pat. No. 4,481,345, herein incorporated by reference);

aromatic polyamines, in particular diamines with sterically hindered amino groups, such as those described as chain extenders in U.S. Pat. No. 4,218,543 and polyhydric alcohols having a molecular weight of 62 to 1000, preferably 62 to 399, and more preferably 400 to 1000.

Suitable low molecular weight alcohols include ethylene glycol, propylene glycol, 1,4-butanediol, glycerol, trimethylolpropane, pentaerythritol, diethylene glycol, dipropylene glycol or mixtures thereof. Suitable higher molecular weight alcohols include polyhydroxy compounds such as epoxide resins, phenolic resins, alkyd resins, castor oil, polyester resins containing hydroxyl groups, silicone resins, polyacrylates, polyethers, polycarbonates and mixtures thereof.

The binder composition is produced by mixing individual components a) and b) and optionally c). In the event that component b) is selected from compounds having reversibly blocked, isocyanate-reactive groups, the resulting coating compositions are stable in storage in the absence of water. After they are applied to a suitable substrate, they rapidly cure in the presence of moisture. If necessary, the curing reaction may also be accelerated by adding known catalysts, such as p-toluenesulphonic acid, dibutyltin octoate or zinc chloride.

When component b) has unblocked isocyanate-reactive groups, i.e., in particular amino or hydroxyl groups, the binder composition has only a limited pot life and should be applied within this period.

The term "binder composition" should be understood to mean that the binders according to the invention contain individual components a) and b) either in the form of one-component systems in which component b) contains blocked iso-cyanate-reactive groups or in the form of two-component systems in which component b) contains unblocked isocyanate-reactive groups.

Hydroxy-functional polyethers, polyesters, polycarbonates and polyacrylates or mixtures containing these polyols and having blocked and/or free isocyanate-reactive groups are preferably used as component b). More preferably polyethers containing hydroxyl groups are used.

The binder compositions according to the invention may be directly used as coating compositions or sealants, i.e., without the addition of additives c). Preferably, they are used in combination with additives c), which are known and include plasticizers (such as tricresyl phosphate, phthalic acid diesters and chloroparaffins), wetting agents, levelling agents, anti-skinning agents, anti-foaming agents, flatting agents (such as silica, aluminum silicates and high-boiling waxes), viscosity regulators, pigments, extenders (such as titanium dioxide, barium sulphate and chalk), carbon blacks, colorants, UV absorbers, and thermal or oxidative stabilizers.

It is also possible to use catalysts such as N,N-dimethylbenzyl-amine, N-methyl-morpholine, dibutyltin dilaurate, DABCO (diazabicyclo-octane) together with desiccants as auxiliary substances c). Suitable desiccants are set forth, for example, in Ullmann, *Enzyklopädie der technischen Chemie*, 4th edition, volume 23, page 421, Verlag Chemie 1983, DE-A-4,032,546 and the documents cited therein. Examples include cobalt, lead, magnesium, zirconium, aluminum, manganese, calcium, cerium, copper, nickel, vanadium, barium and zinc desiccants, and mixtures thereof.

The binders according to the invention may be used in coating compositions for coating any desired substrates such as wood, plastics, leather, paper, textiles, glass, ceramics, plaster, masonry, metals and concrete. They may be applied by conventional methods such as spraying, brushing, flow coating, pouring, dipping and roller coating. The coating compositions may be used as clear lacquers and as pigmented lacquers.

The coating compositions according to the invention are distinguished by surprisingly low susceptibility to blistering. Another advantageous property is that they may be used directly on basic substrates, such as concrete.

In the following examples all parts and percentages are by weight unless otherwise indicated.

EXAMPLES

Example 1

Production of Polyisocyanate Component a) According to the Invention 815.4 g (3.0 moles) of an alcohol (HD-Ocenol 110/130, a product of Henkel KGaA, having an OH value of 200–220 and an iodine value of 110–130, in which approx. 95% of the hydrocarbon chains have 18 carbon atoms) were introduced into a stirred apparatus purged with nitrogen and combined at 70° C. with 168 g (1.0 mole) of 1,6-hexamethylene diisocyanate. After a reaction time of approximately 3 hours at a temperature of 90° C., the NCO content of the resulting urethane component had fallen to less than 0.1%. The allophanatization reaction was then initiated at 88° C. by the addition of 1740 g (10.0 moles) of tolylene diisocyanate (TDI, 2,4- to 2,6-isomer ratio=80:20) and subsequent catalysis with 140 mg of zinc stearate. After 9 hours, the reaction was terminated at an NCO content of 24.2% by adding 140 mg of isophthaloyl chloride. Excess tolylene diisocyanate was then separated by thin film distillation under a vacuum of 0.1–0.3 mbar and at a temperature of 150° C.

Product Data

Yield: 1536 g

Viscosity: 33 mPa·s at 23° C.

Free TDI content: 0.04%

NCO content (i): 9.1%

Theoretical functionality (ii): 2

Allophanate group content (iii): 20%

Hydrocarbon chain content (iiv): 50%

Example 2

Production of Polyisocyanate Component a) According to the Invention 271.8 g (1.0 mole) of the alcohol from example 1 were introduced into a stirred apparatus purged with nitrogen and combined at 90° C. with 84 g (0.5 moles) of 1,4-tetramethylene diisocyanate (BDI). After a reaction time of approximately 8 hours at a temperature of 95° C., the NCO content of the resulting diurethane had fallen to less than 0.2%. The allophanatization reaction was then initiated at 88° C. by the addition of 870 g (5.0 moles) of TDI (see example 1) and subsequently catalyzed with 60 mg of zinc stearate. After 5 hours, an NCO content of 30.5% was reached and the reaction was terminated by adding 120 mg of isophthaloyl chloride. Excess TDI was then separated by thin film distillation under a vacuum of 0.1–0.3 mbar and at a temperature of 150° C.

Product Data

Yield: 488 g

Viscosity: 5000 mPa·s at 23° C.

Free TDI content: <0.03%

NCO content (i): 7.9%

Theoretical functionality (ii): 2

Allophanate group content (iii): 21%

Hydrocarbon chain content (iiv): 52%

Example 3

Production of Polyisocyanate Component a) According to the Invention)

203.3 g (1.0 mole) of an alcohol (technical grade Lorol, a product of Henkel KGaA, having an OH number of 265–275, an iodine number of <0.5 and hydrocarbon chains with 12 to 18 carbon atoms) were introduced into a nitrogen-purged, stirred apparatus with 500 g (0.125 moles) of a polyether (produced by propoxylating propylene glycol and subsequent ethoxylating the propoxylation product, PO/EO mixture ratio 79/21, OH value: 28.5) and combined at 70° C. with 105 g (0.625 moles) of 1,6-hexamethylene diisocyanate. After a reaction time of approximately 13 hours at a temperature of 100° C., the NCO content of the resulting diurethane had fallen to below 0.2%. The allophanatization reaction was then initiated at 85° C. by the addition of 652.5 g (3.75 moles) of TDI (see example 1) and subsequently catalyzed with 73 mg of zinc stearate. After 9 hours the NCO content of 17.3% and the reaction was terminated with 70 mg of isophthaloyl chloride. Excess TDI was then separated by thin film distillation under a vacuum of 0.1–0.3 mbar and at a temperature of 140° C.

Product Data

Yield: 995 g

Viscosity: 7500 mPa·s at 23° C.

Free TDI content: <0.03%

NCO content (i): 5.4%

Theoretical functionality (ii): 2.5

Allophanate group content (iii): 13%

Hydrocarbon chain content (iii): 19%

Examples 4 and 5

Binder Composition According to the Invention and a Comparison Binder

The amount of isocyanate-reactive component b) set forth in table 1 were vigorously mixed in a high speed laboratory stirrer with a desiccant and deaerating agent and, after cooling to room temperature, mixed with polyisocyanate component a) from example 1 or with a polyisocyanate component not according to the invention and cast as a test specimen. The comparison isocyanate was an aromatic prepolymer prepared by reacting a polyisocyanate containing diphenylmethane diisocyanate (MDI) in admixture with its higher homologs with a polyether polyol (Desmodur E-2 1 available from Bayer AG and having an NCO content of 16% and a viscosity of 6500 mPa·s).

When compared to the MDI-based comparison binder composition, the binder composition according to the invention, despite containing catalyst, exhibited a longer pot life and was cured to yield thick, blister-free coatings even at elevated atmospheric humidity. Only severely blistered coatings were obtained with the comparison binder composition, even cured under the more favorable conditions of lower humidity and lower temperature.

TABLE 1

| Composition of the binder compositions | | |
|---|---|---|
| Desmophen 550 U (propylene oxide-based polyether initiated with TMP, MW: 440, a product of Bayer AG, Leverkusen) | 100 | 100 |
| Baylith C paste (zeolite, a product of Bayer AG, Leverkusen) | 10 | 10 |
| Byk A 530 (derating agent, a product of Byk Chemie GmbH, Wesel) | 0.4 | 0.4 |
| Dibutyltin dilaurate (10% in Desmophen 550 U) | 2.5 | — |
| Polyisocyanate from Example 1 | 351 | — |
| Comparison polyisocyanate | — | 182 |
| Pot life in minutes | 40 | 25 |
| Shore D hardness (DIN 53505) | 51 | 54 |
| Curing 20° C., 30% relative atmospheric humidity | blister-free | severe blistering |
| Curing 30° C., 80% relative atmospheric humidity | blister-free | foaming |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for making a blister-free coating comprising:
   (1) applying a substantially solvent-free binder composition to a substrate, the solvent-free binder composition comprising:
      a) a polyisocyanate component containing heteroallophanate groups and having aromatically-bound isocyanate groups,
         i) an NCO content of 3 to 16% by weight based on the weight of the polyisocyanate component,
         ii) an average functionality of 1.8 to 4,
         iii) an allophanate group content (calculated as $C_2HN_2O_3$, MW: 101) of 5 to 35% by weight, based on the weight of the polyisocyanate component, wherein the allophanate groups are prepared from urethane groups that are the reaction product of a linear aliphatic diisocyanate having an isocyanate group content of 30 to 60% by weight, based on the weight of the linear aliphatic diisocyanate, with a hydroxyl component having a hydrocarbon chain of 2 to 23 carbon atoms and an average functionality of less than 1.5 at an NCO/OH equivalent ratio of 1.0:1.0 to 0.5:1.0,
         iv) a hydrocarbon chain content of 10 to 65% by weight, based on the weight of the polyisocyanate component, wherein the hydrocarbon chains are attached to allophanate groups via oxygen and have an average of 2 to 23 carbon atoms and v) a distillable diisocyanate content of less than 0.5% by weight, based on the weight of the polyisocyanate component, and b) an isocyanate-reactive component; and (2) curing the composition.

2. The method of claim 1, wherein the polyisocyanate component of the binder composition used to make the blister-free coating includes:

i) an NCO content of 5 to 13% by weight, based on the weight of the polyisocyanate component, ii) an average functionality of 1.9 to 3, iii) an allophanate group content of 10 to 23% by weight, based on the weight of the polyisocyanate component, and iv) a hydrocarbon chain content of 18 to 53% by weight, based on the weight of the polyisocyanate component, wherein the hydrocarbon chains have an average of 8 to 23 carbon atoms.

3. The method of claim 1, wherein the isocyanate-reactive groups of the binder composition used to make the blister-free coating are hydroxyl groups or amino groups.

4. The method of claim 2, wherein the isocyanate-reactive groups of the binder composition used to make the blister-free coating are hydroxyl groups or amino groups.

5. The method of claim 1, wherein the isocyanate-reactive groups of the binder composition used to make the blister-free coating are reversibly blocked amino groups.

6. The method of claim 2, wherein the isocyanate-reactive groups of the binder composition used to make the blister-free coating are reversibly blocked amino groups.

7. The method of claim 1, wherein the linear aliphatic diisocyanate comprises an aliphatic diisocyanate selected from the group consisting of 1,4-diisocyanatobutene, 1,5-diisocyanatopentane, 1,6-diisocyanatohexane, 2,2,4-trimethyl-1,6-diisocyanato-hexane, 1,11-diisocyanatoundecane, and dodecamethylene diisocyanate.

8. The blister-free coating made by the method claim 1.

9. A method for making a blister-free coating comprising:

(1) applying a substantially solvent-free binder composition to a substrate, the composition comprising:

a) a polyisocyanate component containing heteroallophanate groups and having aromatically-bound isocyanate groups, i) an NCO content of 3 to 16% by weight based on the weight of the polyisocyanate component, ii) an average functionality of 1.8 to 4, iii) an allophanate group content (calculated as $C_2HN_2O_3$, MW: 101) of 5 to 35% by weight, based on the weight of the polyisocyanate component, wherein the allophanate groups are prepared from urethane groups that are the reaction product of a linear aliphatic diisocyanate having an isocyanate group content of 30 to 60% by weight, based on the weight of the linear aliphatic diisocyanate with a hydroxyl component having a hydrocarbon chain of 2 to 23 carbon atoms and an average functionality of less than 1.5 at an NCO/OH equivalent ratio of 1.0:1.0 to 0.5:1.0, the linear aliphatic diisocyanate comprising an aliphatic diisocyanate selected from the group consisting of 1,4-diisocyanatubutane, 1,5-diisocyanatopentane, 1,6-diisocyanatohexane, 2,2,4- trimethyl-1,6-diisocyanato-hexane, 1,11-diisocyanatoundecane, and dodecamethylene diisocyanate;

iv) a hydrocarbon chain content of 10 to 65% by weight, based on the weight of the polyisocyanate component, wherein the hydrocarbon chains are attached to allophanate groups via oxygen and have an average of 2 to 23 carbon atoms; and v) a distillable diisocyanate content of less than 0.5% by weight, based on the weight of the polyisocyanate component, and b) an isocyanate-reactive component selected from the group consisting of hydroxyl groups and amino groups; and (2) curing the composition.

10. The method of claim 9, wherein the isocyanate-reactive groups of the binder composition used to make the blister-free coating are reversibly blocked amino groups.

11. The blister-free coating made by the method claim 9.

* * * * *

UNITED STATES PATENT AND TRADEMARK OFFICE
CERTIFICATE OF CORRECTION

PATENT NO. : 6,410,095 B1 Page 1 of 1
APPLICATION NO. : 08/706551
DATED : June 25, 2002
INVENTOR(S) : Brahm et al.

It is certified that error appears in the above-identified patent and that said Letters Patent is hereby corrected as shown below:

On the title page,
Item [*] delete "0" and insert --824--.

Signed and Sealed this

Fifth Day of December, 2006

JON W. DUDAS
*Director of the United States Patent and Trademark Office*